(12) United States Patent
Moffatt

(10) Patent No.: US 7,457,013 B2
(45) Date of Patent: Nov. 25, 2008

(54) SOURCE DOCUMENT GUIDE APPARATUS AND METHOD

(75) Inventor: John Moffatt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1385 days.

(21) Appl. No.: 10/422,126

(22) Filed: Apr. 23, 2003

(65) Prior Publication Data

US 2004/0212854 A1 Oct. 28, 2004

(51) Int. Cl.
*H04N 1/04* (2006.01)
*B65N 5/00* (2006.01)

(52) U.S. Cl. ............... 358/498; 358/496; 358/488; 271/264; 271/9.09; 271/8.1; 226/196.1; 399/365; 399/367

(58) Field of Classification Search ............... 358/498, 358/496, 296, 401, 501, 488; 399/379, 380, 399/367, 365; 355/75; 226/196.1; 271/8.1, 271/9.09, 264
See application file for complete search history.

(56) References Cited

U.S. PATENT DOCUMENTS

| | | | | |
|---|---|---|---|---|
| 5,136,331 | A * | 8/1992 | Gracie | 399/377 |
| 6,157,466 | A * | 12/2000 | Tu et al. | 358/474 |
| 6,536,645 | B2 * | 3/2003 | Minakawa | 226/196.1 |

* cited by examiner

*Primary Examiner*—Cheukfan Lee

(57) ABSTRACT

A source document guide apparatus prevents curling of a source document as the document is fed through a document reproduction machine. The source document guide includes a flat member having a surface and leading and trailing end portions, and at least one fastener at the leading end portion configured to attach the flat member to the document reproduction machine.

41 Claims, 5 Drawing Sheets

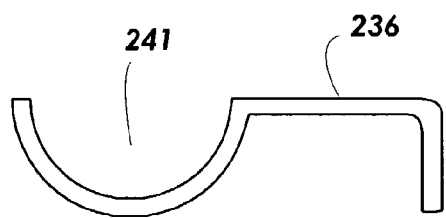
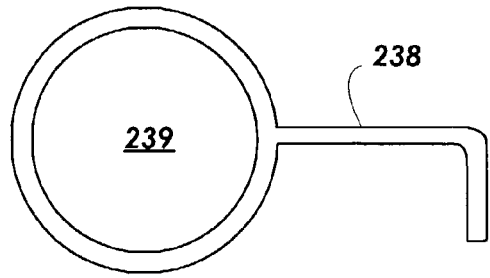
Fig. 7             Fig. 8
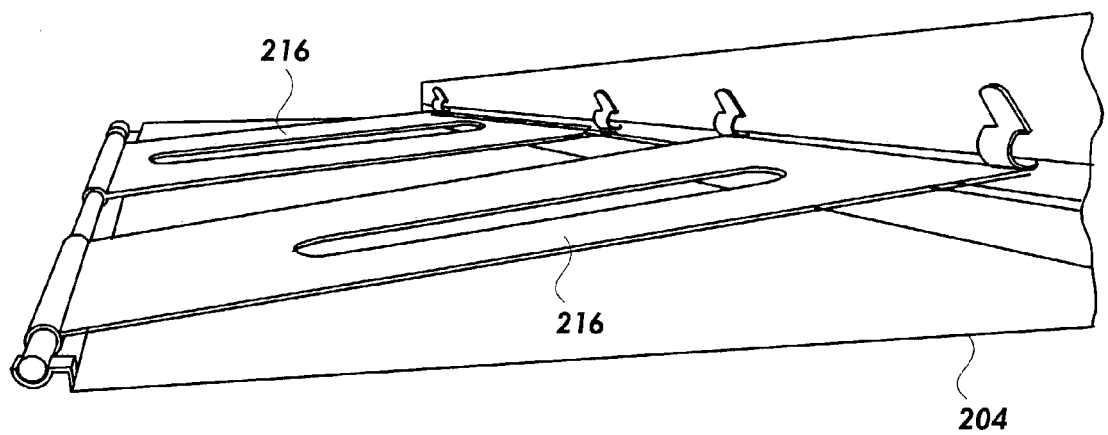
Fig. 9

SOURCE DOCUMENT GUIDE APPARATUS AND METHOD

BACKGROUND

Various peripheral devices have been developed over the years to allow a user to make copies of a source document. A source document may be printed on, for example, a sheet of paper, a transparency, or other print medium. A source document may include, for example, text, graphics, drawings, photographs, and other items. The basic reproduction process involves positioning or passing the source document over a scanning surface so that the image on the document can be captured for electronic or hardcopy reproduction. However, this straightforward process in not so simple when the source document of interest is large-format. This is particularly true when the large-format source documents are rolled for storage.

Common peripheral devices for generating these copies of source documents are scanners and digital copiers. Scanners and digital copiers are often packaged as a single unit that can create either hard copies or electronic files of the source documents. Such packages are sometimes referred to as scanner/copiers. As used herein, the terms "scanner," "copier," "scanner/copier" and "document reproduction machine" may be used interchangeably to refer to an apparatus that can create an electronic or hardcopy of a source document.

Scanners and copiers are available in a variety of sizes, from small hand-held scanners to industrial large-format scanners/copiers. Large-format scanners and copiers are designed to scan and/or copy pages that are, for example, up to sixty inches wide. An example of a large-format scanner or copier (100) is shown in FIG. 1. Large-format pages may include architectural drawings, blueprints, maps, signs, posters, etc.

Although large-format scanners and copiers are convenient for creating electronic and hard copies, they are often quite difficult to use. One of the difficulties with large-format scanners and copiers is keeping source documents straight and flat as they are fed into and out of the scanner or copier.

Most large-format scanners and copiers move the source document forward and back through the machine as various portions of the document are scanned. This ability to move the document both forward and backward through the scanner helps ensure that a quality copy is obtained. However, as the source document is reversed back through the scanner, the document can often become jammed or stuck, especially when the source document has been rolled for storage. The jamming most often occurs when the source document (102) is passed back through the scanner. As the source document curls, it often gets caught on a lip (106) of a scanner lid (108). Therefore, it often requires one or more users to hold the source documents flat and straight, and to monitor the reproduction closely to end up with a high-quality reproduction. FIG. 1 illustrates the tendency of a typical source document (102) to curl away from a surface (104) of the scanner or copier (100). This curling may cause a jam or interfere with the production of a quality copy.

SUMMARY

A source document guide apparatus prevents curling of a source document as the document is fed through a document reproduction machine. The source document guide includes a flat member having a surface and leading and trailing end portions, and at least one fastener at the leading end portion configured to attach the flat member to the document reproduction machine.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 7 is a side view of a first bracket for supporting a source document guide or guide according to one embodiment of the present invention.

FIG. 8 is a side view of a second bracket for supporting a source document guide or guide according to one embodiment of the present invention.

FIG. 9 is a perspective view of multiple source document guides or guides attached to a scanner or copier according to one embodiment of the present invention.

Throughout the drawings, identical reference numbers designate similar, but not necessarily identical, elements.

DETAILED DESCRIPTION

This specification describes a method and apparatus for flattening or preventing the curling of source documents passing through a document reproduction machine. As used in this specification and the appended claims, the terms "scanner," "copier," "scanner/copier," and "document reproduction device" are used broadly to mean any device that is capable of producing electronic copies, hard copies, or both electronic and hard copies of a source document. Preferably, the methods and apparatus described are used in combination with a large-format scanner or copier, but this is not necessarily so. The term "large format" is used to mean something greater than about eleven or twelve inches in width (the maximum width for most standard scanners or copiers). However, the methods and apparatus described herein may be used for any scanner or copier, and are not limited solely to large format scanners.

Figure 2:
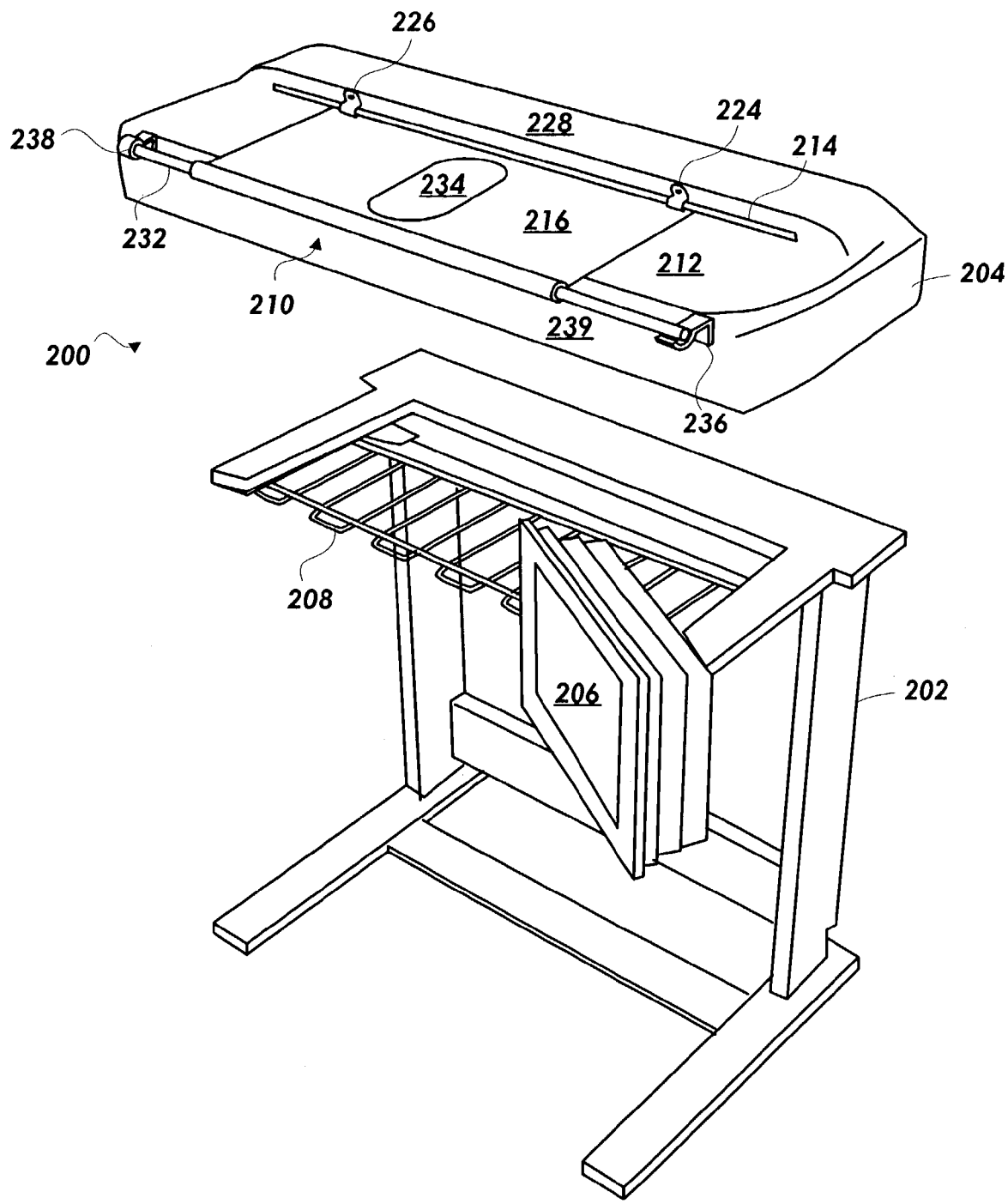
FIG. 2 is a perspective view of a scanner or copier and an associated stand for supporting the scanner or copier, according to one embodiment of the present invention.

Referring now to the figures, and in particular to FIG. 2, a document reproduction device (200) is shown implementing principles described herein. The document reproduction device (200) includes an apparatus for flattening a source document or restricting a source document's tendency to curl as it moves through the document reproduction device (200).

In the example illustrated in FIG. 2, the document reproduction device (200) includes a stand (202) and a scanner unit (204). The scanner (204) includes the components for moving a source document through the scanner and creating an electronic copy of the source document, which can then be stored, transmitted or used to produce a hardcopy of the source document. Scanners which can be used are available from a number of commercial sources.

The stand (202) may be used to support the scanner (204) at a convenient height for the ease of a user. Alternatively, the scanner (204) may simply be placed on a table, desk or other support. The scanner (204) may include a user interface for controlling the operation of the scanner (204). Additionally or alternatively, the stand (204) may include a user interface that can be connected with the scanner (204) and, perhaps, a computer to facilitate user-control of the scanner (204) and storage or transmission of the electronic copies of source documents. In the example of FIG. 2, the user interface on the stand (202) includes a touch screen (206). The stand (202) may also include a drawer (208) that slides open and closed underneath the scanner (204) and can be used for storage as will be discussed in more detail below.

In the example shown in FIG. 2, the scanner (204) rests on the stand (202) during normal operation. The scanner (204) also includes a document flattening apparatus (210) that prevents a source document from curling up as that document moves through the scanner (204). The document flattening apparatus (210) may take on one of several different forms. Various examples of a document flattening apparatus are discussed below.

Figure 1:
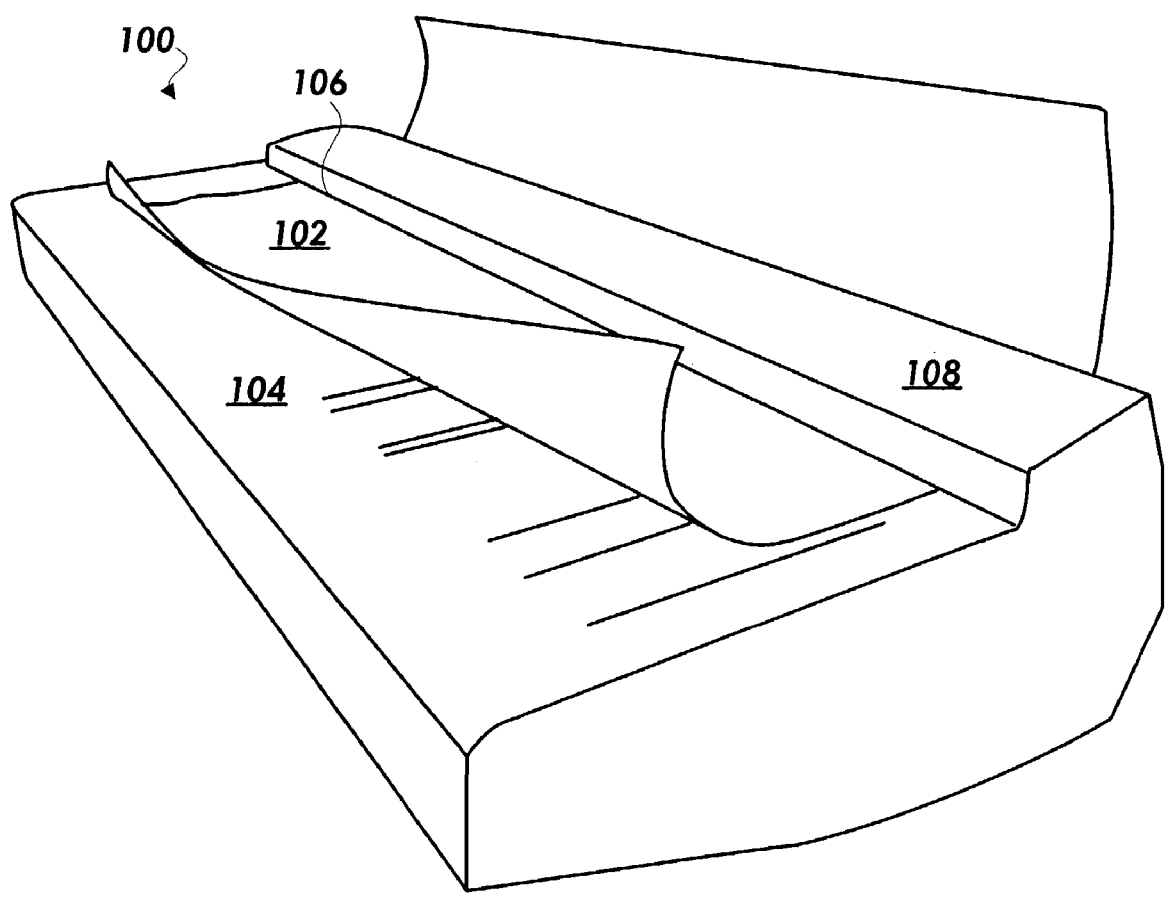
FIG. 1 is a perspective view of a scanner or copier with a source document curling according to the prior art.

Generally, the document flattening apparatus (210) is arranged above a flat surface (212) of the scanner (204) and guides source documents as they enter or exit a source document feed slot (214) of the scanner (204). Source documents enter and exit the source document feed slot (214) by passing between the document flattening apparatus (210) and the surface (212) of the scanner (204). Accordingly, source documents that tend to curl, as shown in FIG. 1, are straightened and flattened and prevented from curling away from the surface (212) where they may interfere with other scanner (204) components.

Figure 3:
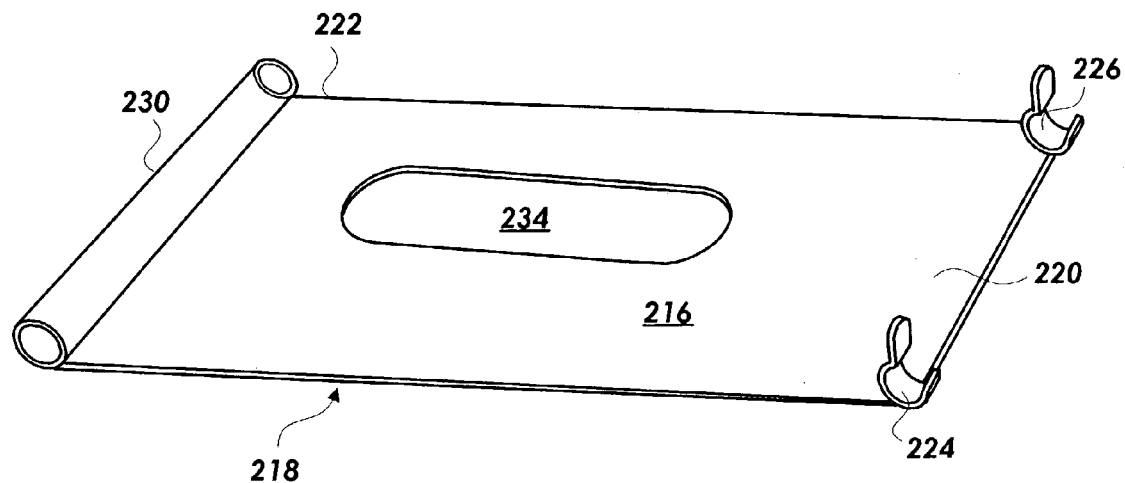
FIG. 3 is a perspective view of a source document guide or guide for use with a scanner or copier according to one embodiment of the present invention.

According to the embodiment of FIG. 2, the document flattening apparatus (210) includes a source document guide or guide. The source document guide or guide of FIG. 2 includes a flat member (216). The flat member (216) is shown in more detail in FIG. 3. Referring then to FIG. 3, the flat member (216) is shown having a generally rectangular shape. The flat member (216) may, however, include any desirable shape and is not limited to the rectangular configuration shown, nor is it limited to shapes with only straight sides. The flat member (216) preferably includes a substantially smooth and flat surface (218) intended for disposition opposite of the top surface (212, FIG. 2) of the scanner (204, FIG. 2). The substantially smooth and flat surface (218) provides a plane that source documents tending to curl are readily guided under and along without jamming. Thus, source documents that tend to curl are prevented from doing so by the flat member (216).

The flat member (216) includes a leading end portion (220) and a trailing end portion (222). When the flat member (216) is coupled to the scanner (204), as shown in FIG. 2, the leading end portion (220) is located at the document feed slot (214). At least one fastener is located at the leading end portion (220) of the flat member (216) to secure the flat member (216) to the scanner (204).

According to FIGS. 2-3, the at least one fastener is a pair of clips (224 and 226). The pair of clips (224 and 226) may be attached or coupled to the flat member (216) (e.g. via a rivet, adhesive, screw, etc.) or may be integral with the flat member (216). The clips (224 and 226) are generally C-shaped in the figures, but this is not necessarily so. The clips (224 and 226) may be replaced by any convenient fastener that facilitates attachment to the scanner (204) or other document reproduction machine. The clips (224 and 226) provide one simple mechanism for selectively snap-fitting the flat member (216) to a cover lid (228) of the scanner (204). The clips (224 and 226) are preferably curved such that they guide or "funnel" source documents from the document feed slot (214) under the flat member (216).

Opposite of the leading end portion (220), the flat member (216) includes a trailing end portion (222). In some embodiments, the trailing end portion (222) includes another fastener. The fastener at the trailing end portion (222) may be formed as a tubular receptacle (230). According to the embodiment of FIG. 3, the tubular receptacle (230) is integrally formed as part of the flat member (216), but this is not necessarily so. The tubular receptacle (230) is generally cylindrical in the embodiment shown, but other shapes including those with regular and irregular polygonal cross-sections may also be used. The tubular receptacle (230) is receptive of a substantially rigid bar (232) shown in FIG. 2 and discussed in more detail below with reference to FIG. 5. The bar (232, FIG. 2) extends through the tubular receptacle (230) to support the trailing end portion (222) above the top surface (212) of the scanner (204) and to limit movement of the flat member (216).

The flat member (216) of FIGS. 2-3 may also include a hole or opening (234) disposed therein. The opening (234) shown in FIGS. 2-3 is generally elliptical, but the opening may be any shape. The opening (234) facilitates access through the flat member (216) to enable a user to push, pull, or guide a source document as that source document is inserted or withdrawn from the scanner (204).

The flat member (216) may be made of plastic, paper, coated paper, fabric, metal, or other materials. Depending on the material used for construction, the flat member (216) may be rigid enough to maintain its shape permanently against any forces normally associated with the reproduction of a source document. If the flat member (216) is not made of a rigid material, the use of the bar (232) in the tubular receptacle (230) can hold the flat member (216) rigid enough to effect the flattening of a source document passing under the flat member (216).

The use of a flat member as a document flattening apparatus is not limited to the configuration illustrated in FIG. 3. For example, with reference to FIG. 4, an alternative flat member (316) may only include a flat surface (322) and the fasteners (224 and 226) at a leading end portion (320) of the flat surface (322). Because there is no fastener or support at the trailing end portion (322) of the flat member (316), the trailing end portion (322), and perhaps other portions of the flat member (316), rest on the top surface (212, FIG. 2) of the scanner (204, FIG. 2) when the flat member (316) is attached thereto.

Figure 4:
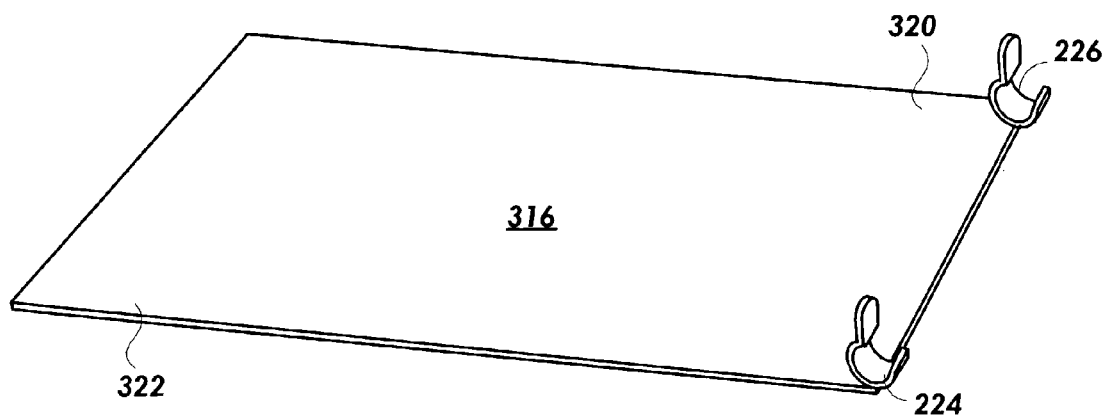
FIG. 4 is a perspective view of another source document guide or guide for use with a scanner or copier according to one embodiment of the present invention.

As before, the flat member (316) may be formed of a rigid or a non-rigid material such as those mentioned above. The flat member (316) allows source documents to pass thereunder without bunching up or jamming when the flat member (316) is attached to the cover lid (228, FIG. 2) of the scanner (204, FIG. 2). The flat member (316) of FIG. 4 is preferably a paper product coated with a polymer to facilitate the passage of source documents and lengthen its useful life. Although the flat member (216) is light enough to allow source documents to pass thereunder without jamming, the flat member (216) is also heavy enough to flatten or straighten documents that tend to curl.

Figure 5:
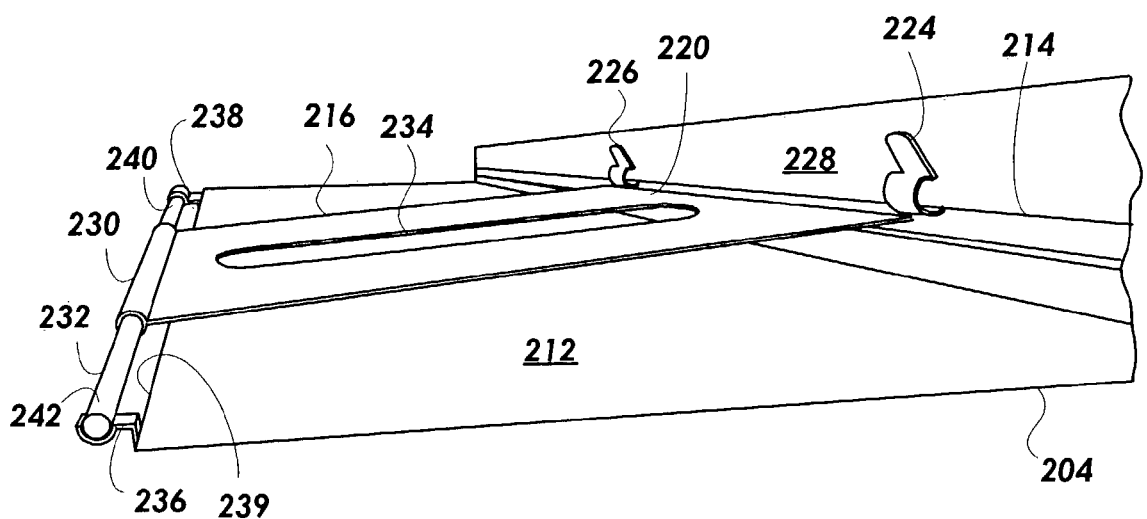
FIG. 5 is a perspective view of the source document guide or guide shown in FIG. 3 but attached to a scanner or copier according to one embodiment of the present invention.

A more detailed view of the flat member (216) of FIG. 2 attached to the scanner (204) is shown in perspective in FIG. 5. The clips (224 and 226) of the leading end portion (220) are engaged with the cover lid (228) and hold the leading end portion (220) slightly above the top surface (212) of the scanner (204). The trailing end portion (222) is also supported above the top surface (212) of the scanner by extending the bar (232) through the tubular receptacle (230) of the flat member (216) and engaging the bar (232) with at least one bracket (236, 238). The use of a bracket limits movement of the bar, and hence, movement of the flat member (216).

According to FIG. 5, there are two brackets, a first and a second bracket (236 and 238) disposed at opposite ends of, and supporting, the bar (232). A side view of one embodiment of the first bracket (236) is shown in detail in FIG. 7. A side view of one embodiment of the second bracket (238) is shown in FIG. 8. In the example of FIG. 8, the second bracket (238) includes a circular recess (239) that is receptive of one end (240) of the bar (232) and limits the movement of the bar (232) to a single direction (out of the recess) when the end (240) of the bar (232) is inserted therein. The first bracket (236), on the other hand, includes a concave surface or cup (241) that the first end (242) of the bar (232) can conveniently rest in before or after insertion of the second end (240) of the bar (232) into the first recess (239). The first and second brackets (236 and 238) facilitate easy installation of the bar (232) without the aid of any tools or adjustments to the brackets.

While the first and second brackets (236 and 238) are sized to support the bar (232) in the embodiment of FIG. 2, alternative embodiments of the straightening apparatus (210) may not include the bar (232). In such embodiments, the brackets may be sized to support the tubular receptacle (230) of the flat member (216) itself. Alternatively, the tubular receptacle (230) may not be replaced with a bar or cylindrical portion that is integrally formed with the flat member (216) in place of the tubular receptacle (230) and removable bar (232).

Additionally, as shown in FIG. 4, embodiments exist in which the flat member (316) excludes both the tubular receptacle (230) and the bar (232). In such an embodiment, the brackets (236 and 238) may both be omitted.

Returning to FIG. 5, by inserting the bar (232) through the tubular receptacle (230) and mounting the bar (232) to the brackets (236 and 238), the flat member (216) is free to slide from side to side along the bar (232) to any convenient position. The clips (224 and 226) also allow sliding movement along the cover lid (228). Therefore, depending on the width of the source document being reproduced, the flat member (216) may be moved to any position to most effectively reduce or eliminate curling of the document as it moves in and out of the source document feed slot (214).

The brackets (236 and 238) are mounted to a front surface (239) of the scanner (204) at a spacing greater than the effective width of the document feed slot (214) so that all source documents of width equal to or less than the effective width of the document feed slot (214) may be reproduced without hindrance from the brackets (236 and 238). That is, source documents may pass under the flat member (216) and between the brackets (236 and 238) into and out of the scanner (204).

The brackets (236 and 238) may be attached to the scanner (204) by any of a number of mechanisms. For example, the brackets may be attached with an adhesive, rivets, screws, clips, or any other fastening means. As mentioned above, the brackets (236 and 238) are attached to a front surface (239) of the scanner (204) in FIGS. 2, 5, and 6, but this is not necessarily so. The brackets (236 and 238) may attach to any convenient portion of the scanner (204). In addition, the brackets (236 and 238) may be retractable according to some aspects, facilitating movement of the bar (232) toward and away from the scanner (204).

Figure 6:
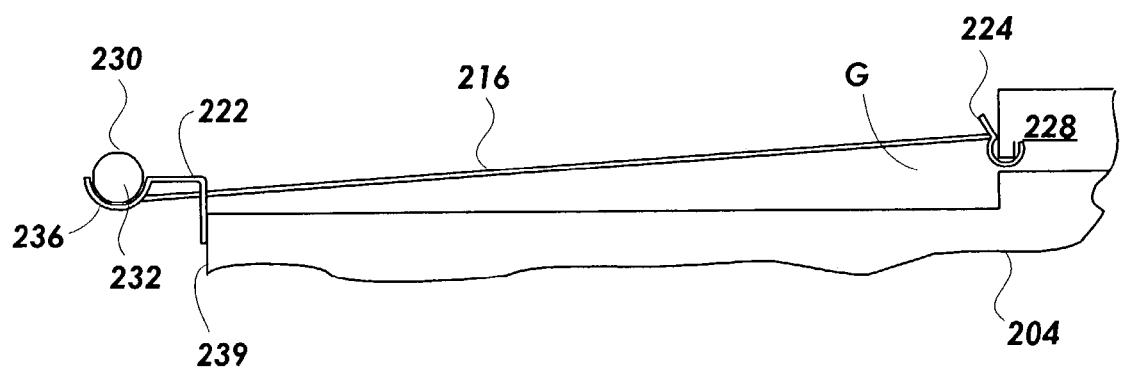
FIG. 6 is a side view of the source document guide or guide attached to the scanner or copier of FIG. 5.

As illustrated in the side view of FIG. 6, by attaching the clips (224 and 226) to the cover lid (228) and extending the bar (232) through the tubular receptacle (230), a gap (G) is maintained between the top surface (212) of the scanner (204) and the flat member (216). The gap (G) ensures that source documents will pass between the flat member (216) and the top surface (212) without jamming, while the flat member (216) also flattens any source document that may have a tendency to curl.

The width of a flat member (216 or 316) may be varied from one application to another. For example, there may be some flat members (216 and 316) designed with a width extending substantially the same distance as the width of the scanner (204) or source document feed slot (214). Other flat members may have widths that are only a fraction of scanner width. In addition, there may be multiple flat members (216) attached to the scanner (204) as shown in FIG. 9. Multiple flat members (216) may be used, for example, at the edges of a wide source document to flatten that source document as opposed to using one very wide flat member.

When the flat members (216 or 316) are not in use, they may be removed from the scanner and stored, for example, in the stand (202) shown in FIG. 2. The clips (224 and 226) of the flat member (216 or 316) may snap-fit with the wire drawer (208) of the stand (202) for ease of storage.

Operation of the scanner (204) with a flattening apparatus according to principles taught herein is next discussed. In some embodiments, a source document is inserted under the flat member (216) and into the source document feed slot (214) of the scanner (204). The source document may be accessed, if necessary, through the opening (234) in the flat member (216). The source document passes through the scanner (204) to begin the document reproduction process. At various times during the document reproduction process, the path of the source document may be reversed, sending the document at least partially out of the feed slot (214). This reversal is common with many scanners to ensure an accurate copy. As the path of the source document is reversed, the document is guided by the clips (224 and 226) under the flat member (216). The flat member (216) flattens the source document if the source document has a tendency to curl and prevents the source document from interfering with, or getting stuck in, other scanner (204) components. If the flat member (216 or 316) does not include an opening (234, FIG. 3), the flat member may be lifted by the user to facilitate initial insertion of the source document into the feed slot (214).

The use of a source document guide to flatten source documents, especially large format source documents, facilitates document reproduction without the problems that occur when the source document tends to curl. While the source document guides described herein include flat members (216 and 316) that may be selectively attached to and detached from the scanner (204), any source document guide may used according to principles described herein to flatten a source document. The source document guides may be permanently attached or otherwise arranged to flatten source documents as they are fed into and out of the scanner (204). The present invention contemplates the use of any source document guide to guide or flatten any source document as it enters or exits the scanner (204).

The preceding description has been presented only to illustrate and describe embodiments of invention. It is not intended to be exhaustive or to limit the invention to any precise form disclosed. Many modifications and variations are possible in light of the above teaching. The principles of the invention may be adapted to any scanner or copier. It is intended that the scope of the invention be defined by the following claims.

What is claimed is:

1. A source document guide apparatus for preventing curling of a source document as said document is fed through a document reproduction machine, said source document guide comprising:
   a flat member having a surface and leading and trailing end portions; and
   at least one fastener at said leading end portion configured to attach said flat member to said document reproduction machine.

2. The apparatus of claim 1, wherein said flat member further comprises an opening disposed therein to facilitate access to a source document through said flat member.

3. The apparatus of claim 1, wherein said flat member is substantially rectangular.

4. The apparatus of claim 1, wherein said flat member comprises plastic.

5. The apparatus of claim 1, wherein said flat member comprises a paper product and a polymer coating.

6. The apparatus of claim 1, wherein said at least one fastener is configured to attach to a cover lid of said document reproduction machine.

7. The apparatus of claim 1, wherein said at least one fastener comprises a clip, said clip comprising a curved surface for guiding media passing through said document reproduction machine under said flat member.

8. The apparatus of claim 7, wherein said clip snap-fits onto a cover lid of said document reproduction machine.

9. The apparatus of claim 1, wherein said at least one fastener is attached to said document reproduction machine at a source document feed slot.

10. The apparatus of claim 1, further comprising at least one fastener at said trailing end portion of said flat member.

11. The apparatus of claim 10, wherein said at least one fastener at said trailing end portion is integral to said flat member.

12. The apparatus of claim 10, wherein said at least one fastener at said trailing edge portion comprises a tubular receptacle.

13. The apparatus of claim 12, wherein said at least one fastener at said trailing edge portion further comprises a substantially rigid bar inserted into said tubular receptacle of said flat member, wherein said substantially rigid bar limits movement of said flat member.

14. The apparatus of claim 13, wherein said at least one fastener at said trailing edge portion further comprises at least one bracket for supporting said substantially rigid bar, said at least one bracket configured to attach to said document reproduction machine.

15. The apparatus of claim 14, wherein said substantially rigid bar supports said trailing end portion of said flat member above a top surface of said document reproduction machine.

16. The apparatus of claim 1, wherein said at least one fastener at said leading edge portion supports at least a portion of said flat member above a top surface of said document reproduction in machine.

17. The apparatus of claim 1, wherein said document reproduction machine comprises a large-format scanner, a copier, or a scanner/copier.

18. An apparatus comprising:
   a scanner/copier having a source document feed slot and a top surface adjacent said document feed slot; and
   a source document guide disposed over said top surface, said source document guide comprising a flat member having a first substantially smooth and flat surface facing said top surface of said scanner/copier for preventing curling of a source document being fed through said document feed slot;
   wherein said flat member is substantially rectangular.

19. The apparatus of claim 18, wherein said flat member is spaced from said top surface of said scanner/copier at a leading end portion of said flat member.

20. The apparatus of claim 18, wherein said flat member comprises an opening for providing access to said source document.

21. An apparatus comprising:
   a scanner/copier having a source document feed slot and a top surface adjacent said document feed slot; and
   a source document guide disposed over said top surface, said source document guide comprising a flat member having a first substantially smooth and flat surface facing said top surface of said scanner/copier for preventing curling of a source document being fed through said document feed slot;
   wherein said flat member is spaced from said top surface of said scanner/copier at a leading end portion of said flat member, and
   wherein said leading end portion comprises at least one fastener attached to said scanner/copier and supporting said leading end portion above said top surface of said scanner/copier.

22. The apparatus of claim 21, wherein said at least one fastener comprises a snap-fit clip engaged with a top cover of said scanner/copier.

23. The apparatus of claim 22, further comprising at least two snap-fit clips engaged with said top cover.

24. An apparatus comprising:
   a scanner/copier having a source document feed slot and a top surface adjacent said document feed slot;
   a source document guide disposed over said top surface, said source document guide comprising a flat member having a first substantially smooth and flat surface facing said top surface of said scanner/copier for preventing curling of a source document being fed through said document feed slot; and
   a substantially rigid bar of said source document guide attached to a front surface of said scanner/copier.

25. The apparatus of claim 24, further comprising a tubular receptacle at a trailing end portion of said flat member, wherein said substantially rigid bar is disposed in said tubular receptacle and supports said trailing end portion above said top surface of said scanner/copier.

26. The apparatus of claim 24, wherein said substantially rigid bar is attached to said front surface of said scanner/copier via at least two brackets, wherein a first of said at least two brackets comprises a recess receptive of a first end of said substantially rigid bar; and a second of said at least two brackets comprises an open concave surface receptive of a second end of said substantially rigid bar.

27. A guide for flattening curled source documents comprising a substantially flat member having at least one fastener at an end of said flat member for attaching said flat member over a document feed slot of a scanner, said flat member comprising a substantially flat, smooth surface under which a source document is fed through said document feed slot.

28. The guide of claim 27, further comprising at least one opening disposed in said substantially flat, smooth surface for providing access through said guide to a source document.

29. The guide of claim 27, further comprising a tubular receptacle disposed in said guide.

30. The guide of claim 29, further comprising a substantially rigid bar inserted into said tubular receptacle of said guide, wherein said substantially rigid bar supports and limits movement of said flat member.

31. A method of reproducing a source document comprising:
  inserting said source document under a source document guide and into a source document feed slot of a scanner or copier;
  guiding and flattening said source document under said source document guide as the source document is fed into said scanner or copier: and
  inserting a substantially rigid bar into a tubular receptacle of said source document guide, wherein said substantially rigid bar limits movement of said source document guide.

32. The method of claim 31, further comprising:
  reversing said source document at least partially out of said feed slot; and
  guiding and flattening said source document under said source document guide as the source document is reversed.

33. The method of claim 31, further comprising selectively attaching and detaching said source document guide to said scanner or copier with at least one fastener.

34. The method of claim 31, further comprising accessing a source document under said source document guide through an opening in said source document guide.

35. A method of flattening a document comprising:
  passing said document between a top surface of a scanner or copier and a source document guide attached to said scanner or copier: and
  selectively attaching said source document guide to said scanner or copier with at least one fastener.

36. The method of claim 35, wherein said document is a large-format document.

37. The method of claim 36, wherein said passing further comprises both inserting said large-format document into said scanner or copier and reversing said large-format document out of said scanner or copier.

38. The method of claim 35, further comprising spacing said source document guide from said top surface.

39. The method of claim 35, further comprising forming said source document guide from plastic.

40. The method of claim 35, further comprising forming said source document guide from polymer-coated paper.

41. An apparatus for guiding source documents of a scanner or copier comprising:
  a flat member having leading and trailing end portions and a substantially flat, smooth surface;
  wherein said leading end portion comprises at least one first fastener configured to selectively engage a cover lid of said scanner or copier;
  wherein said trailing end portion comprises at least one second fastener; and
  wherein said at least one first and second fasteners support said flat member above a top surface of said scanner or copier and facilitate passage of source documents therebetween.

* * * * *

UNITED STATES PATENT AND TRADEMARK OFFICE
CERTIFICATE OF CORRECTION

PATENT NO. : 7,457,013 B2 Page 1 of 1
APPLICATION NO. : 10/422126
DATED : November 25, 2008
INVENTOR(S) : John Moffatt It is certified that error appears in the above-identified patent and that said Letters Patent is hereby corrected as shown below:

In column 7, line 59, in Claim 16, after "reproduction" delete "in".

In column 9, line 14, in Claim 31, delete "copier:" and insert -- copier; --, therefor.

In column 10, line 4, in Claim 35, delete "copier:" and insert -- copier; --, therefor.

Signed and Sealed this

Fourth Day of August, 2009

JOHN DOLL
*Acting Director of the United States Patent and Trademark Office*